Dec. 8, 1942.    R. BELL    2,304,672
MATERIAL HANDLING APPARATUS
Filed Oct. 22, 1941
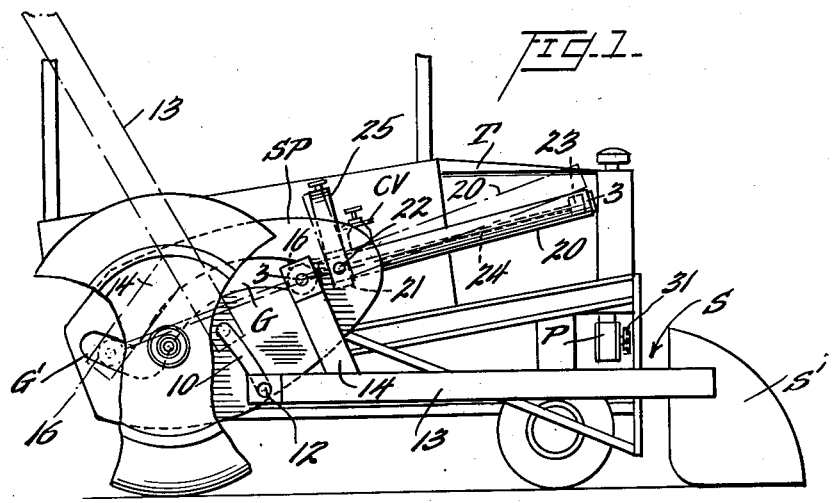
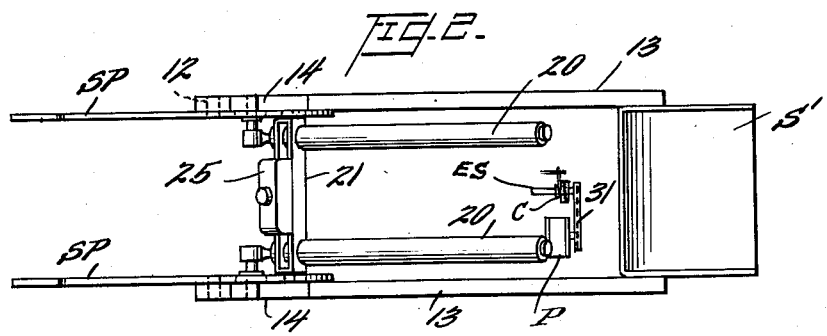
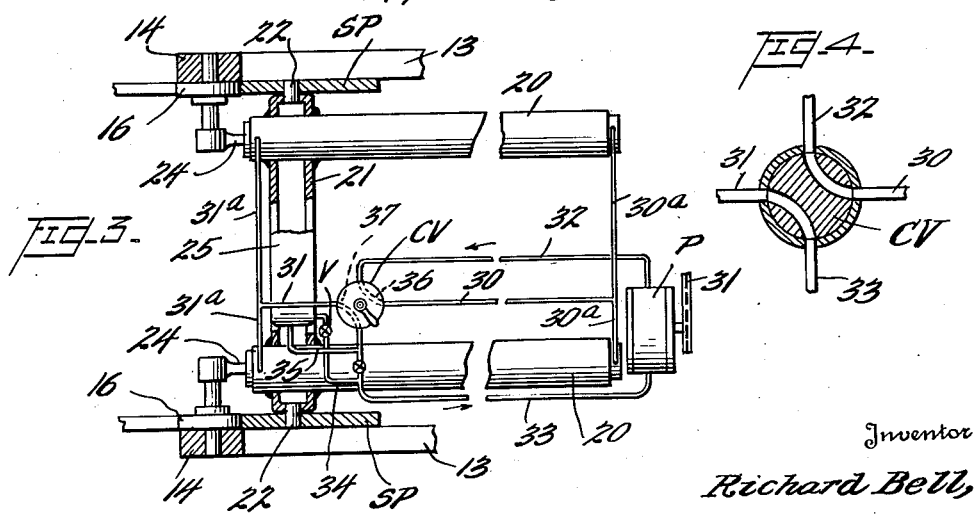
Inventor
Richard Bell,
By Wm S. Hodges.
Attorney Patented Dec. 8, 1942

2,304,672

UNITED STATES PATENT OFFICE 2,304,672

MATERIAL HANDLING APPARATUS

Richard Bell, Paris, Tenn., assignor to Bell Clay Company, St. Louis, Mo., a corporation of Missouri Application October 22, 1941, Serial No. 416,108

9 Claims. (Cl. 214—131)

This invention is a material handling device of the type in which a shovel-like element is manipulated in such manner as to elevate the material to a higher plane, and to deposit it at the elevated position.

One of the objects of the invention is to provide an apparatus of the type mentioned by means of which piled material may be conveniently loaded into cars, trucks or other available means of transportation, although not limited to this particular use. A further object is to provide a material handling means of the character mentioned which may be readily attached to a motor vehicle of any kind, preferably a light tractor, and so arranged that the shovel element may be operated by means of power generated by the motor vehicle engine. A further object is to provide means for causing the shovel to travel rearwardly as it is elevated, so as to discharge the load at a position in the rear of the tractor. A further object is to provide an improved hydraulic mechanism for imparting the operative movements to the shovel member.

The invention will be hereinafter fully set forth and particularly pointed out in the claims.

In the accompanying drawing:

Figure 1 is a side elevation illustrating the handling device applied to a well known form of light tractor.

Figure 2 is a top plan view illustrating the handling device detached from the tractor.

Figure 3 is an enlarged top plan view, partly in section.

Figure 4 is a detail diagrammatic view of the power-control valve.

Referring to the drawing, T designates a motorized vehicle which may be of any desired construction, a well known commercial type of light tractor having been selected for purposes of illustration. SP designates two laterally spaced side plates, which for convenience may be the sides of the tractor casing, or they may be separate as shown in the drawing and attached to said sides. Said side plates are provided with approximately horizontal guide slots G of arcuate form arranged in juxtaposition with respect to each other, the rear ends of which are provided with upwardly and rearwardly offset extensions G'. The side plates are also provided with approximately vertical slots 10 which are of slightly arcuate form, and in juxtaposition with respect to each other. The curvature of the slots G is on an arc having the lower end of the slot 10 as its center.

S designates a shovel member comprising a scoop portion S' mounted between arms 13, the rearward extremities of said arms being provided with laterally disposed pins 12 extended into and movable within the slots 10. The arrangement is such that the arms 13 are free for pivotal movement in the lower ends of the slots 10, and the pins 12 are so arranged that they may travel upwardly through said slots 10 during the said pivotal movement. The arms 13 are provided with fixed actuator members 14 which extend rearwardly and upwardly from the arms, and are provided with guide rollers 16 located within the slots G and so arranged as to be free to travel in the latter and into and within the rearward extensions G' thereof.

Suitable power means for imparting reciprocative movement to the rollers 16 is provided. As shown in the drawing two cylinders 20 are fixedly mounted in a carrier 21 which is provided with pivot members 22 at its ends, said pivot members movably engaging suitable openings in the opposite side plates SP. Reciprocatively mounted in the cylinders 20 are pistons 23, which are connected with rods 24 which are pivotally connected with the upper ends of the actuator members 14.

The pistons may be reciprocated within their cylinders by any well known means such as compressed air or fluid pressure, but it is preferred to utilize fluid pressure for the purpose. For purposes of illustration, a liquid reservoir 25 for oil or other suitable liquid is mounted upon the carrier 21. A pressure pump P is supported in suitable manner by the frame of the tractor so as to be conveniently operated by means of a sprocket chain 31 connected with the engine shaft ES, a suitable clutch C being provided to connect and disconnect the pump shaft with the source of power.

Pressure fluid is supplied to one end of each piston by means of a supply conduit 30 having branches 30ª leading to the respective cylinders. Pressure is supplied to the other ends of the pistons by a conduit 31 having branches 31ª leading to the respective last mentioned ends. The pump P is provided with a main discharge or pressure conduit 32 and a main return conduit 33. Mounted upon the carrier 21 is a fluid reservoir, and leading therefrom is a conduit 34 which is connected to conduit 33, and the tank is also provided with an overflow conduit 35 which is also connected with said conduit 33. The conduits 34 and 35 are provided with check valves V, V' (conventionally illustrated) of any desired construction to prevent reverse flow of the liquid through the said conduits.

The conduits 30, 31, 32 and 33 are all connected with a control valve CV which may be of any desired construction. Said valve is provided with passage means 36 so located that in one position of the valve the conduit 32 will be placed in communication with the conduit 30 and the conduit 31 will be connected with the return conduit 33. Said valve is also provided with passage means 37 so located that in a reversed position of the valve the pressure conduit 32 will be placed in communication with conduit 31 and conduit 30 will be placed in communication with conduit 33. With the valve in neutral position all fluid flow is interrupted.

In operation, assuming that the pump P has been operatively connected with the engine shaft ES, and that the shovel member S has been dropped to the position indicated in Figure 1, the tractor is propelled forwardly so as to drive the scoop S' into the piled material. Thereupon, the valve CV is operative to apply the fluid pressure through conduit 32 to valve CV, and to the cylinders 20 through conduits 31 and 31ᵃ so as to force the pistons to the left, as viewed in Figure 1. As a result, the rollers 16 are first caused to travel rearwardly in the slots G through an arcuate path, thereby raising the shovel member S on the pivot pins 12, and as the rollers 16 travel upwardly into the higher parts of the slots G the pins 12 will rotate in the lower ends of the slots 10. This movement will continue until the rollers 16 have travelled out of the arcuate portions of the slots G and into the offset portions G' thereof, whereupon the shovel member will be elevated, this movement being permitted because the pins 12 are free to travel upwardly in the slots 10. Rearward and upward travel will be arrested when the rollers 16 contact with the closed ends of said offset portions. At this point, the shovel member S and its parts will be in the dotted line positions illustrated in Figure 1, so that the scoop S' will be brought to an inclined position, sufficiently steep to effect discharge of the load upon a truck or other vehicle stationed behind the tractor, or upon an elevated platform or storage bin, as the case may be. It will be observed that during its above-described travel the scoop S' will follow a path over the top of the tractor and to the rear thereof. As the load is dumped, the position of the valve CV is reversed and fluid pressure is then introduced into the cylinders through conduits 30, 30ᵃ, whereupon the fluid pressure will be applied to return the shovel member to its original position in front of the tractor. It will be noted that the offset slot extension G' will cause the shovel member to move rearwardly and upwardly as it approaches the dumping position and forwardly and downwardly as it leaves the last mentioned position.

The advantages of the invention will be readily apparent to those skilled in the art to which it belongs. For example, it will be observed that a very simple and efficient pressure controlled apparatus is provided by means of which the shovel member may be manipulated. A further advantage is attained by means of the simplified structure wherein the shovel member is directly supported by the side plates. An important advantage resides in the arrangement of the fluid pressure means for actuating the shovel, and that the power required to maintain the necessary pressure may be readily obtained by means of a very simple means readily connectible with the engine shaft of the tractor.

Having thus explained the nature of the invention and described an operative manner of constructing and using the same, although without attempting to set forth all of the forms in which it may be made, or all of the forms of its use, what is claimed is:

1. A material handling device comprising side plates provided with approximately vertically positioned arcuate slots and also having approximately horizontally positioned arcuate slots arranged in juxtaposition with respect to each other in a plane above said vertical slots, the curvature of the horizontal slots being concentric with the lower ends of the vertically disposed slots, a shovel member having arms provided with means movably engaging said vertically disposed slots, actuator members fixedly secured to said arms and having means movably engaging the horizontal arcuate slots, means for imparting forward and rearward movements to the actuator members, said horizontal slots having rearward and upwardly offset portions for causing the actuator members to travel rearwardly and upwardly or downwardly and forwardly, respectively, while actuated by the movement-imparting means.

2. A material handling device of the character described having in combination relatively spaced side plates, a shovel member having arms, each arm having rigidly related relatively spaced portions movably engaging said side plates, fluid pressure means pivotally supported by said side plates, means connecting said fluid pressure means and said shovel member so as to impart forward and rearward movements to the shovel member, said side plates having means engaging the relatively spaced portions of said arms for imparting rearward and upward and forward and downward movements respectively to the shovel member at one end of the forward and rearward movements of the latter under the influence of said fluid pressure means, and means controlling the operation of said fluid pressure means.

3. A material handling device of the character described having in combination relatively spaced side plates, a shovel member having arms pivotally engaging said side plates and also free for limited vertical movement in the side plates, actuator arms secured to the shovel member and also engaging said side plates, a cylinder support pivotally mounted between said side plates, relatively spaced cylinders fixedly mounted in said support, pistons in said cylinders movably connected with said actuator arms, and fluid pressure control means for operating said pistons so as to actuate the shovel, the portions of the side plate engaged with the shovel arms and the actuator arms respectively having means for imparting upward and rearward and downward and forward bodily movements to the shovel during the actuation thereof.

4. A material handling device comprising side plates, a shovel member having arms movably mounted in said side plates, actuator members connected with said arms, a fluid pressure means movably supported by said guide plates and including pistons and piston rods connecting the pistons with said actuator members, means for controlling said pistons so as to move said actuator members forwardly and rearwardly, said side plates being provided with guide means for imparting rearward and upward and forward and downward movements respectively, to said actuator members while the latter are being moved by said pistons.

5. A material handling device of the character described having in combination guide means, a shovel member, an angularly disposed actuator arm fixedly secured to the shovel member, and means for imparting approximately horizontal forward and rearward movements to said actuator arm, said guide means having a relatively fixed portion engaging the actuator arm and so shaped as to impart arcuate travel to the arm during said forward and rearward movements, and also to impart upward and downward travel thereto at the rearmost extremity of the arcuate travel, said guide means also including a second relatively fixed portion with which the rear end of the rigid shovel member is pivotally and slidingly engaged, said second fixed guide portion being so shaped as to free said rear end for movements upwardly and downwardly concurrently with the respective upward and downward movements of said actuator arm.

6. A material handling device of the character described having in combination a guide plate provided with an arcuate slot having an upwardly offset portion at its rear end, a shovel member, an angularly disposed actuator arm fixedly secured to the shovel member, means for imparting forward and rearward movements to said actuator arm in a path conforming to the arcuate portion of the slot, and also upward and downward movements thereto in a path conforming to the offset portion of said slot, and a second relatively fixed guide means carried by said guide plate with which the rear end of the shovel member is engaged, said second guide means being so shaped as to free said rear end for movements upwardly and downwardly concurrently with the respective upward and downward movements of the actuator arm.

7. A material handling device of the character described having in combination relatively spaced side plates each provided with guide means, a shovel member having arms, actuator members fixedly secured to the respective shovel arms and having portions also movably engaging the side plates, means for imparting forward and rearward movements to the actuator members, said guide means having relatively fixed portions engaging the actuator arms and so shaped as to impart arcuate travel to said actuator arms during said forward and rearward movements and also to impart upward and downward travel thereto at the rearmost extremity of the arcuate travel, said guide means also including a second relatively fixed portion pivotally and slidingly engaged with the rear ends of the shovel arms and so shaped as to free said rear ends for movements upwardly and downwardly concurrently with the respective upward and downward movements of said actuator arms.

8. A material handling device of the character described having in combination oppositely disposed side plates provided with juxtapositioned arcuate slots, each of said slots having an upwardly offset portion at its rear end, a shovel member having rearwardly extended arms, actuator members fixedly secured to the respective shovel arms and having portions movably engaging said arcuate slots, means engaging the actuator members for imparting forward and rearward movements thereto in paths conforming to the arcuate portions of said slots, and also to impart upward and downward movements thereto in paths conforming to the offset portions of said slots, said guide plates also having relatively fixed juxtapositioned guide portions pivotally engaged with the rear ends of said shovel arms and so shaped as to free said rear ends for movements upwardly and downwardly concurrently with the respective upward and downward movements of said actuator arms.

9. A material handling device of the character described having in combination relatively spaced side plates provided with horizontally disposed juxtapositioned arcuate slots, each slot having a rearwardly and upwardly offset portion at its rear end, said side plates also having vertically disposed juxtapositioned arcuate slots located below the first mentioned slots, a shovel member having arms pivotally mounted at their rear ends in said vertical slots, actuator arms fixedly secured to said shovel arms and having portions movably engaging the horizontal slots, means engaging said actuator arms for imparting forward and rearward movements thereto in paths conforming to the arcuate portions of said slots and also upward and downward movements thereto in paths conforming to the offset portions of said slots, said vertical slots being so positioned with respect to the offset portions of the arcuate slots as to free the shovel member arms for movement upwardly and downwardly concurrently with the upward and downward movement of the actuator arms.

RICHARD BELL.